US009281006B2

(12) United States Patent
Lu et al.

(10) Patent No.: US 9,281,006 B2
(45) Date of Patent: Mar. 8, 2016

(54) SYSTEMS AND METHODS FOR ATI CHARACTERIZATION

(71) Applicant: LSI Corporation, San Jose, CA (US)

(72) Inventors: Lu Lu, San Jose, CA (US); Haitao Xia, San Jose, CA (US); Lu Pan, San Jose, CA (US); Xiufeng Song, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/148,407

(22) Filed: Jan. 6, 2014

(65) Prior Publication Data

US 2015/0170706 A1    Jun. 18, 2015

Related U.S. Application Data

(60) Provisional application No. 61/916,019, filed on Dec. 13, 2013.

(51) Int. Cl.
G11B 20/10    (2006.01)

(52) U.S. Cl.
CPC .... *G11B 20/10046* (2013.01); *G11B 20/10212* (2013.01)

(58) Field of Classification Search
None
See application file for complete search history.

(56) References Cited

U.S. PATENT DOCUMENTS

| 5,132,988 | A | * | 7/1992 | Fisher et al. | 375/233 |
|---|---|---|---|---|---|
| 5,349,609 | A | * | 9/1994 | Tsujimoto | 375/347 |
| 5,434,883 | A | * | 7/1995 | Kimoto et al. | 375/231 |
| 5,586,100 | A | * | 12/1996 | Lee et al. | 369/53.33 |
| 5,666,339 | A | * | 9/1997 | Honguh | 369/124.13 |
| 5,696,756 | A | * | 12/1997 | Fujimoto et al. | 369/275.4 |
| 5,703,855 | A | * | 12/1997 | Kirino et al. | 369/53.19 |
| 7,729,071 | B2 | | 6/2010 | Harada | |
| 7,733,592 | B2 | | 6/2010 | Hutchins et al. | |
| 7,982,994 | B1 | | 7/2011 | Erden et al. | |
| 8,250,434 | B2 | | 8/2012 | Yang | |
| 8,537,482 | B1 | | 9/2013 | Song et al. | |
| 8,917,467 | B1 | * | 12/2014 | Xia et al. | 360/39 |
| 2002/0012306 | A1 | * | 1/2002 | Hayami et al. | 369/59.21 |
| 2002/0018422 | A1 | * | 2/2002 | Tonami | 369/59.22 |
| 2002/0141306 | A1 | * | 10/2002 | Miyanabe et al. | 369/47.17 |
| 2002/0154430 | A1 | * | 10/2002 | Rae et al. | 360/25 |
| 2003/0002407 | A1 | * | 1/2003 | Fujiwara | 369/47.5 |
| 2004/0202083 | A1 | * | 10/2004 | Ogawa et al. | 369/59.25 |
| 2004/0257955 | A1 | * | 12/2004 | Yamanaka et al. | 369/59.22 |
| 2006/0092803 | A1 | * | 5/2006 | Tatsuzawa et al. | 369/59.22 |
| 2007/0053261 | A1 | * | 3/2007 | Frisson et al. | 369/47.28 |
| 2008/0151704 | A1 | | 6/2008 | Harada | |
| 2009/0135693 | A1 | | 5/2009 | Kim | |
| 2011/0041028 | A1 | | 2/2011 | Liu et al. | |
| 2011/0103527 | A1 | | 5/2011 | Liu et al. | |
| 2012/0063022 | A1 | | 3/2012 | Mathew | |
| 2012/0063023 | A1 | | 3/2012 | Mathew | |
| 2012/0063024 | A1 | | 3/2012 | Mathew | |

(Continued)

OTHER PUBLICATIONS

Gibson et al "Directions for Shingled-Write and Two-Dimensional Magnetic Recording System" Architectures: Synergies with Solid-State Disks Carnegie Mellon Univ. May 1, 2009.

(Continued)

*Primary Examiner* — Peter Vincent Agustin

(57) ABSTRACT

Systems, methods, devices, circuits for data processing, and more particularly to data processing including adjacent track interference detection and/or characterization.

21 Claims, 4 Drawing Sheets

(56) References Cited

U.S. PATENT DOCUMENTS

| | | |
|---|---|---|
| 2012/0063284 A1 | 3/2012 | Mathew et al. |
| 2013/0021689 A1 | 1/2013 | Haratsch |
| 2013/0083418 A1 | 4/2013 | Worrell et al. |
| 2013/0286498 A1 | 10/2013 | Haratsch et al. |
| 2014/0192934 A1* | 7/2014 | Ciacci et al. .................. 375/329 |

OTHER PUBLICATIONS

U.S. Appl. No. 14/109,804, filed Dec. 13, 2013 Haitao Xia Unpublished.

U.S. Appl. No. 13/705,116, filed Dec. 4, 2012 George Mathew Unpublished.

U.S. Appl. No. 13/912,063, filed Jun. 6, 2013 Fan Zhang Unpublished.

U.S. Appl. No. 13/784,448, filed Mar. 4, 2013 Jun Xiao Unpublished.

U.S. Appl. No. 13/618,317, filed Sep. 14, 2012 Jun Xiao Unpublished.

Wu, et al., "Equation Based LDPC Decoder for Intersymbol Interference Channels" 2005 IEEE International Conf. on Acoustics, Speech, and Signal Processing vol. 5 Mar. 2005.

* cited by examiner

SYSTEMS AND METHODS FOR ATI CHARACTERIZATION

CROSS REFERENCE TO RELATED APPLICATIONS

The present application claims priority to (is a non-provisional of) U.S. Pat. App. No. 61/916,019 entitled "Systems and Methods for ATI Characterization", and filed Dec. 13, 2013 by Lu et al. The entirety of the aforementioned provisional patent application is incorporated herein by reference for all purposes.

FIELD OF THE INVENTION

Embodiments are related to systems and methods for data processing, and more particularly to systems and methods for detecting and/or mitigating adjacent track interference (ATI) in a data storage system.

BACKGROUND

As the density of information stored on a storage medium increases, the potential for interference between adjacent information also increases. This interference can cause data errors when previously stored information is accessed from the storage medium. In some cases, correcting for interference is possible, but determining that interference has occurred is difficult.

Hence, for at least the aforementioned reasons, there exists a need in the art for advanced systems and methods for data storage.

SUMMARY

Embodiments are related to systems and methods for data processing, and more particularly to systems and methods for detecting and/or mitigating adjacent track interference in a data storage system.

Various embodiments of the present invention provide data processing systems that include an adjacent track interference characterization circuit. The adjacent track interference characterization circuit is operable to provide an interference characterization output representing interference from one or more adjacent tracks on a current track based at least in part on a data input derived from the current track. The adjacent track interference characterization circuit includes: an equalizer circuit, a summation circuit, and a tap value adaptation circuit. The equalizer circuit is operable to apply an equalization algorithm to the data input to yield an equalized output. Application of the equalization algorithm is governed by a tap value. The summation circuit is operable to calculate an error value as a difference between the equalized output and an ideal output. The tap value adaptation circuit is operable to update the tap value to reduce the error value. The tap value is provided as the interference characterization output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
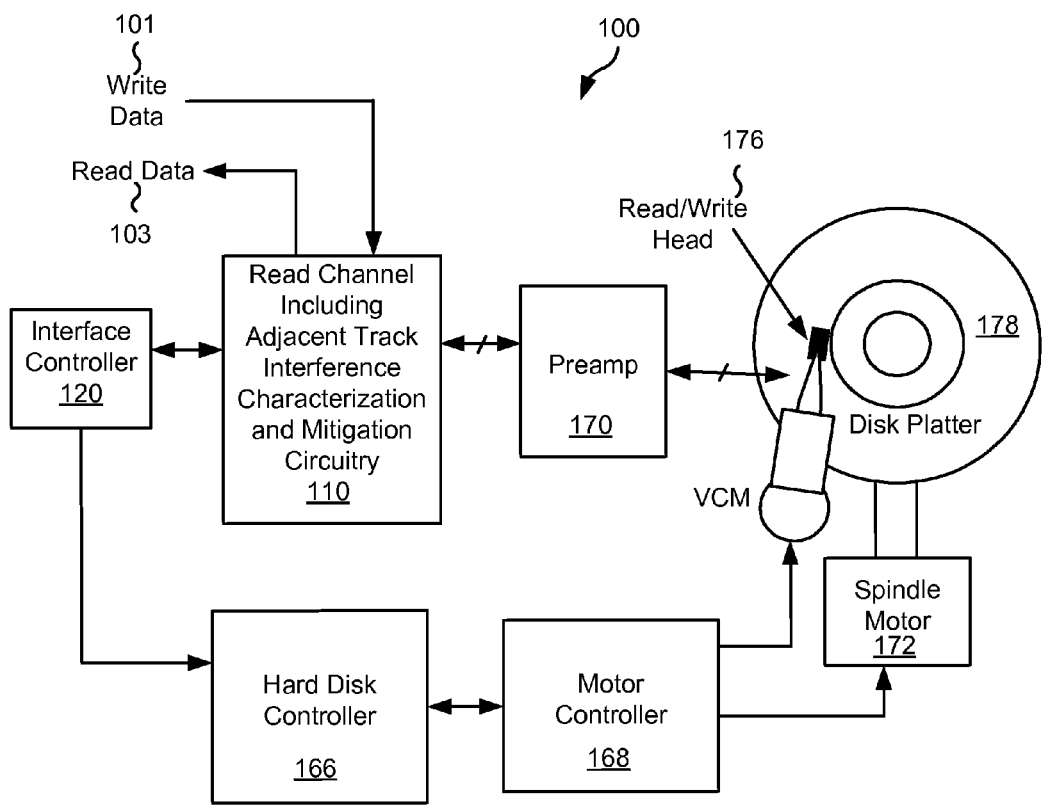
FIG. 1a shows a storage system including adjacent track interference characterization and mitigation circuitry.

Embodiments are related to systems and methods for data processing, and more particularly to systems and methods for detecting and/or mitigating adjacent track interference in a data storage system.

Various embodiments of the present invention provide data processing systems that include an adjacent track interference characterization circuit. The adjacent track interference characterization circuit is operable to provide an interference characterization output representing interference from one or more adjacent tracks on a current track based at least in part on a data input derived from the current track. The adjacent track interference characterization circuit includes: an equalizer circuit, a summation circuit, and a tap value adaptation circuit. The equalizer circuit is operable to apply an equalization algorithm to the data input to yield an equalized output. Application of the equalization algorithm is governed by a tap value. The summation circuit is operable to calculate an error value as a difference between the equalized output and an ideal output. The tap value adaptation circuit is operable to update the tap value to reduce the error value. The tap value is provided as the interference characterization output. In some cases, the system is implemented as an integrated circuit. In various cases, the system is implemented as part of a storage device including a storage medium, and the current track and the one or more adjacent tracks are on the storage medium.

In some instances of the aforementioned embodiments, the interference characterization output increases in value as a function of a number of times the adjacent tracks are written after the current track is written. In various embodiments of the present invention, the equalizer circuit is a single tap equalizer circuit. In some cases, the single tap equalizer circuit is a single tap digital finite impulse response circuit. In one or more embodiments of the present invention, the systems further include a loop detector circuit operable to apply a loop detection algorithm to the data input to yield a detected output, wherein the ideal output is derived from the detected output. In some cases, a selector circuit is included that is operable to select one of the detected output or a known data set as the ideal output.

In one or more instances of the aforementioned embodiments, the equalizer circuit is a first equalizer circuit, the equalized output is a first equalized output, the error value is a first error value, the summation circuit is a first summation circuit, the tap value adaptation circuit is a first tap value indication circuit, and the data processing system further includes: a second equalizer circuit, a second summation circuit, and a second tap value adaptation circuit. The second equalizer circuit is operable to apply an equalization algorithm to the data input to yield a second equalized output. Application of the equalization algorithm is governed by two or more tap values. The second summation circuit operable to calculate a second error value as a difference between the second equalized output and the ideal output, and the second tap value adaptation circuit operable to update the two or more tap values to reduce the second error value.

In various instances of the aforementioned embodiments, the data processing system further includes a comparator circuit operable to compare the interference characterization output with a threshold value to yield an interference indicator. In some cases the threshold value is programmable. In other cases, the threshold value is fixed.

Other embodiments of the present invention provide methods for characterizing adjacent track interference in a storage device that include: applying an equalization algorithm to a data input derived from a current track to yield an equalized output where application of the equalization algorithm is governed by a tap value; calculating an error value using a summation circuit where the error value is a difference between the equalized output and an ideal output; adaptively updating the tap value to reduce the error value using a least mean squared algorithm; and providing the tap value as an interference characterization output. In some cases, the interference characterization output increases in value as a function of a number of times the adjacent tracks are written after the current track is written.

In various instances of the aforementioned embodiments, the equalizer circuit is a single tap digital finite impulse response circuit. In one or more instances of the aforementioned embodiments, applying the equalization algorithm to the data input derived from the current track to yield the equalized output is governed by a single tap value, the equalized output is a first equalized output, the error value is a first error value, and the summation circuit is a first summation circuit. In such instances, the methods further include: applying the equalization algorithm to the data input derived from the current track to yield a second equalized output where application of the equalization algorithm is governed by two or more tap value; calculating a second error value using a second summation circuit where the second error value is a difference between the second equalized output and the ideal output; adaptively updating the two or more tap values to reduce the second error value using a least mean squared algorithm; and providing the second equalized output as a processing input to a processing circuit. In some such instances, the processing circuit includes: a data detector circuit operable to a apply a data detection algorithm to the processing input to yield a detected output; and a data decoder circuit operable to apply a data decoding algorithm to a decoder input derived from the detected output to yield a decoded output.

Turning to FIG. 1a, a storage system 100 including a read channel circuit 110 having adjacent track interference characterization and mitigation circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

Figure 1B:
FIG. 1b shows a number of tracks on a storage medium that may be used in relation to various embodiments of the present invention.

In a typical read operation, read/write head assembly 176 is accurately positioned by motor controller 168 over multiple data tracks on disk platter 178. Read/write head assembly 176 includes two or more read heads capable of sensing data from two or more tracks at the same time. An example 151 of read/write assembly 176 is shown in FIG. 1b that includes three consecutive tracks 153, 155, 157 of a disk platter. It has been determined that interference from data written on adjacent tracks 153, 157 on track 155 increases as a function of the number of times that adjacent tracks 153, 157 are written and re-written. Referring again to FIG. 1a, motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent to a desired track of disk platter 178 (e.g., track 155), magnetic signals representing data on the track are sensed by read/write head assembly 176 as disk platter 178 is rotated by spindle motor 172. The stream of sensed magnetic signals are provided as a continuous, minute analog signal representative of the magnetic data on the track of disk platter 178. This stream of minute analog signals is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, adjacent track interference is monitored. Where the monitored interference exceeds one or more threshold values, a branch metric calculation performed as part of a data detection process is modified to mitigate the interference. In some cases, the read channel circuit may include circuitry similar to that discussed in relation to FIG. 2 or FIG. 4 as are described below to perform interference characterization and mitigation, and/or may operate similar to the methods discussed below in relation to FIGS. 3a-3b or 5a-5b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk.

For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
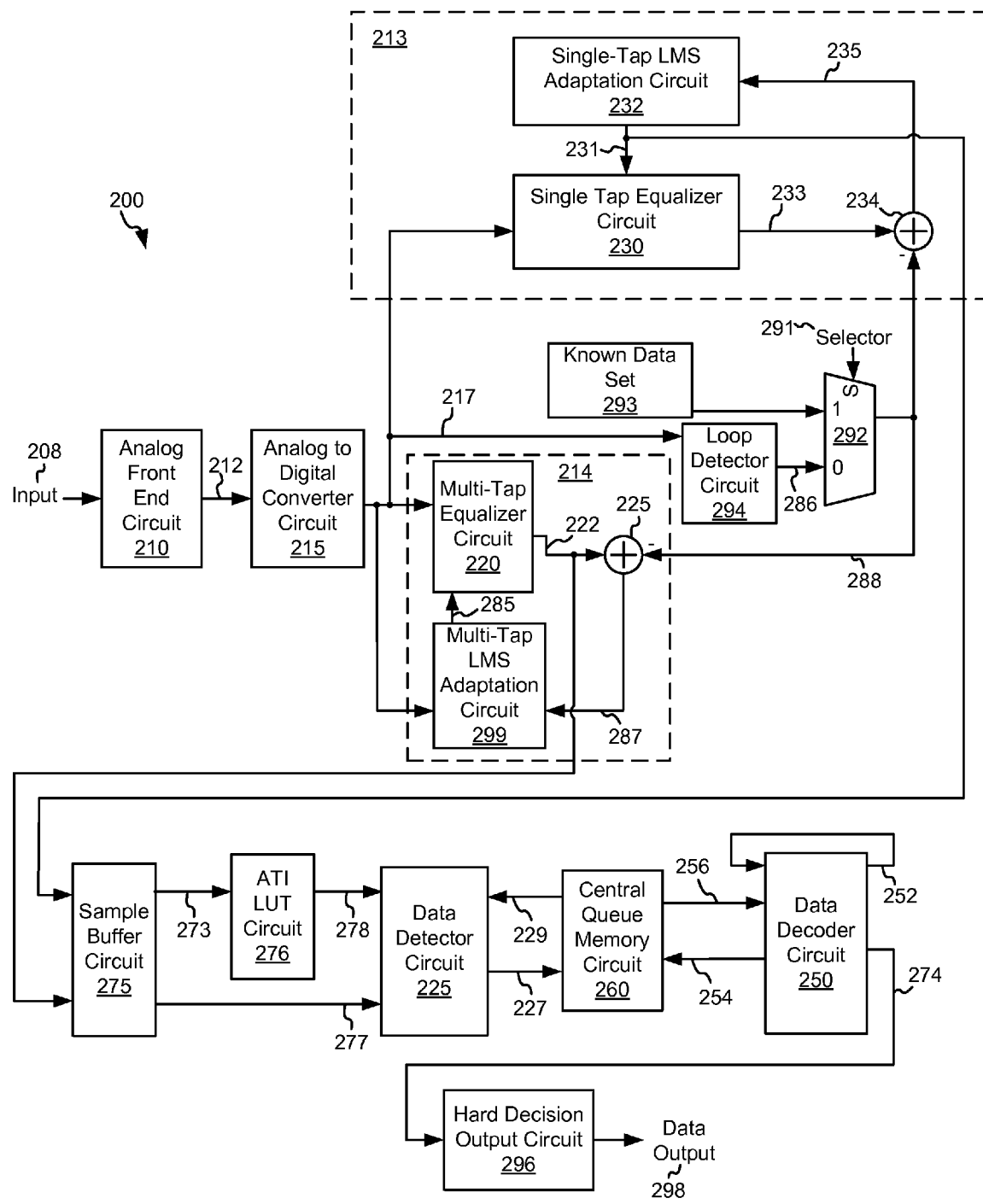
FIG. 2 shows a data processing circuit including adjacent track interference characterization and mitigation circuitry in accordance with some embodiments of the present invention.

FIG. 2 shows a data processing circuit 200 including adjacent track interference characterization circuit 213 and mitigation circuitry in accordance with some embodiments of the present invention. Data processing circuit 200 includes an analog front end circuit 210 that receives an analog input 208. Analog front end circuit 210 processes analog input 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog input signal 208 is derived from a read/write head assembly (not shown) that is disposed in relation to a storage medium (not shown). Based upon the disclosure provided herein, one of ordinary skill in the art will recognize a variety of source from which analog input signal 208 may be derived.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 217 are provided to adjacent track interference characterization circuit 213, a loop detector circuit 294, and an equalization circuit 214.

Loop detector circuit 294 may be any circuit known in the art that applies some type of algorithm designed to return a representation of the data from which analog input 208 was derived. The representation of the data is provided as a detected output 286. In one particular embodiment of the present invention, loop detector circuit 294 is operable to determine timing feedback and other operations designed to align the sampling of analog to digital converter circuit 215 with the received data set, and/or to adjust a gain applied by analog front end circuit 210. Based upon the disclosure provided herein, one of ordinary skill in the art will recognize a variety of circuits capable of providing a representation of the data from which analog input 208 was derived that may be used in relation to different embodiments of the present invention. A multiplexer circuit 292 selects one of detected output 286 and a known data set 293 as an ideal output 288 based upon a selector input 291. Known data set 293 corresponds to data previously stored to a storage medium that is received via analog input 208.

Adjacent track interference characterization circuit 213 includes a single-tap equalizer circuit 230 operable to apply an equalization algorithm to digital samples 217 governed by a single-tap 231 to yield an equalized output 233. In some embodiments of the present invention, single-tap equalizer circuit 230 is a digital finite impulse response circuit as is known in the art. A summation circuit 234 subtracts ideal output 288 from equalized output 233 to yield an error output 235 as shown in the following equation:

Error Output 235=Equalized Output 233−Ideal Output 288.

Error output 235 drives a least mean squared (LMS) algorithm. In particular, error output 235 is provided to a single-tap LMS adaptation circuit 232 that adjusts single-tap 231 to reduce error output 235.

It has been determined that the magnitude of single-tap 231 corresponds to interference from one or more adjacent tracks. In particular, the value of signal-tap 231 increases the more times adjacent tracks are written without re-writing the current track. Thus, single-tap 231 provides an indication of the level of adjacent track interference. In one study, it was found that a value of single-tap 231 is approximately 0.77 when no adjacent track writes have been performed, 0.83 for ten adjacent track writes, 0.84 for twenty adjacent track writes, 0.86 for fifty adjacent track writes, 0.88 for one hundred adjacent track writes.

Equalization circuit 214 includes a multi-tap equalizer circuit 220 operable to apply an equalization algorithm to digital samples 217 governed by a multi-tap input 285 to yield an equalized output 222. In some embodiments of the present invention, multi-tap equalizer circuit 220 is a digital finite impulse response circuit as is known in the art. A summation circuit 225 subtracts ideal output 288 from equalized output 222 to yield an error output 287 as shown in the following equation:

Error Output 287=Equalized Output 222−Ideal Output 288.

Error output 287 drives a least mean squared (LMS) algorithm. In particular, error output 287 is provided to a multi-tap LMS adaptation circuit 299 that adjusts multi-tap input 285 to reduce error output 287.

Equalized output 222 and the corresponding instance of single-tap 231 are provided to a sample buffer circuit 275. Sample buffer circuit 275 includes sufficient memory to maintain one or more codewords until processing of that codeword is completed through data detector circuit 225 and a data decoder circuit 250 including, where warranted, multiple "global iterations" defined as passes through both data detector circuit 225 and data decoder circuit 250 and/or "local iterations" defined as passes through data decoding circuit 250 during a given global iteration. Sample buffer circuit 275 stores the received equalized output 222 as buffered data 277, and single-tap 231 as adjacent track interference characterization output 273.

Data detector circuit 225 is a data detector circuit capable of producing a detected output 227 by applying a data detection algorithm to buffered data 277. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 225 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

When data detector circuit 225 is available, the next set of buffered data 277 is accessed from sample buffer 275 along with the corresponding adjacent track interference characterization output 273. Adjacent track interference characterization output 273 is provided to an adjacent track interference (ATI) lookup table (LUT) circuit 276. Based upon the value of adjacent track interference characterization output 273, ATI LUT circuit 276 returns a previously programmed ATI mitigation factor 278. The values stored in ATI LUT circuit 276 my be generated by first calibrating noise predictive coefficients and biases for a track that is read back before adjacent tracks are written (i.e., non-ATI results), and subsequently calibrating noise predictive coefficients and biases for the same track after writing the adjacent tracks a defined number of times (ATI results) (e.g., twenty times or more). The difference between the non-ATI results and the ATI results are calculated for problematic patterns (e.g., '00000,', '11111', '10000', '01111', '11000', and '00111'). An average of the difference from each of the problematic patterns is calculated, and is provided as ATI mitigation factor 278 for the corresponding value of adjacent track interference characterization output 273.

In some embodiments of the present invention, ATI LUT circuit 276 returns a zero as ATI mitigation factor 278 for adjacent track interference characterization output 273 less than a threshold value, and a non-zero value as ATI mitigation factor 278 for adjacent track interference characterization output 273 greater than or equal to a threshold value. In such a case, ATI LUT circuit 276 may be replaced with a comparator circuit. In other embodiments of the present invention, ATI LUT circuit 276 returns a zero as ATI mitigation factor 278 for adjacent track interference characterization output 273 less than a first threshold value, and a first non-zero value as ATI mitigation factor 278 for adjacent track interference characterization output 273 greater than or equal to the first threshold value and less than the second threshold value, and a second non-zero value as ATI mitigation factor 278 for adjacent track interference characterization output 273 greater than or equal to the second threshold value. In yet other embodiments of the present invention, ATI LUT circuit 276 provides a respective value as ATI mitigation factor 278 that is chosen from hundreds of values and selected based upon the received adjacent track interference characterization output 273. ATI LUT circuit 276 may be pre-programmed with values determined during a characterization process.

The data detection algorithm applied by data detector circuit 225 includes calculating a branch metric in accordance with the following equation:

$$\text{Branch Metric} = \min\left(\sum_{i,j} \frac{(\text{buffered data}(i) - \text{ideal output}_j - \text{ATI mitigation factor}_j)^2}{2\sigma_j^2}\right)$$

As shown, the aforementioned branch metric calculation is modified by ATI mitigation factor 278 to reduce the impact of adjacent track interference. The modified branch metric calculation reduces to the following branch metric calculation used in data detection algorithms known in the art where:

$$\text{Branch Metric} = \min\left(\sum_{i,j} \frac{(\text{buffered data}(i) - \text{ideal output}_j)^2}{2\sigma_j^2}\right).$$

Application of the data detection algorithm including the adjacent track interference modified branch metric calculation results in a detected output 227.

Detected output 227 is provided to a central queue memory circuit 260 that operates to buffer data passed between data detector circuit 225 and data decoder circuit 250. When data decoder circuit 250 is available, data decoder circuit 250 receives detected output 227 from central queue memory 260 as a decoder input 256. Data decoder circuit 250 applies a data decoding algorithm to decoder input 256 in an attempt to recover originally written data. The result of the data decoding algorithm is provided as a decoded output 254. Similar to detected output 227, decoded output 254 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 250 provides the result of the data decoding algorithm as a data output 274. Data output 274 is provided to a hard decision output circuit 296 where the data is reordered before providing a series of ordered data sets as a data output 298.

One or more iterations through the combination of data detector circuit 225 and data decoder circuit 250 may be made in an effort to converge on the originally written data set. As mentioned above, processing through both the data detector circuit and the data decoder circuit is referred to as a "global iteration". For the first global iteration, data detector circuit 225 applies the data detection algorithm without guidance from a decoded output. For subsequent global iterations, data detector circuit 225 applies the data detection algorithm to buffered data 277 as guided by decoded output 254. Decoded output 254 is received from central queue memory 260 as a detector input 229.

During each global iteration it is possible for data decoder circuit 250 to make one or more local iterations including application of the data decoding algorithm to decoder input 256. For the first local iteration, data decoder circuit 250 applies the data decoder algorithm without guidance from a decoded output 252. For subsequent local iterations, data decoder circuit 250 applies the data decoding algorithm to decoder input 256 as guided by a previous decoded output 252. In some embodiments of the present invention, a default of ten local iterations is allowed for each global iteration.

Figure 3A:
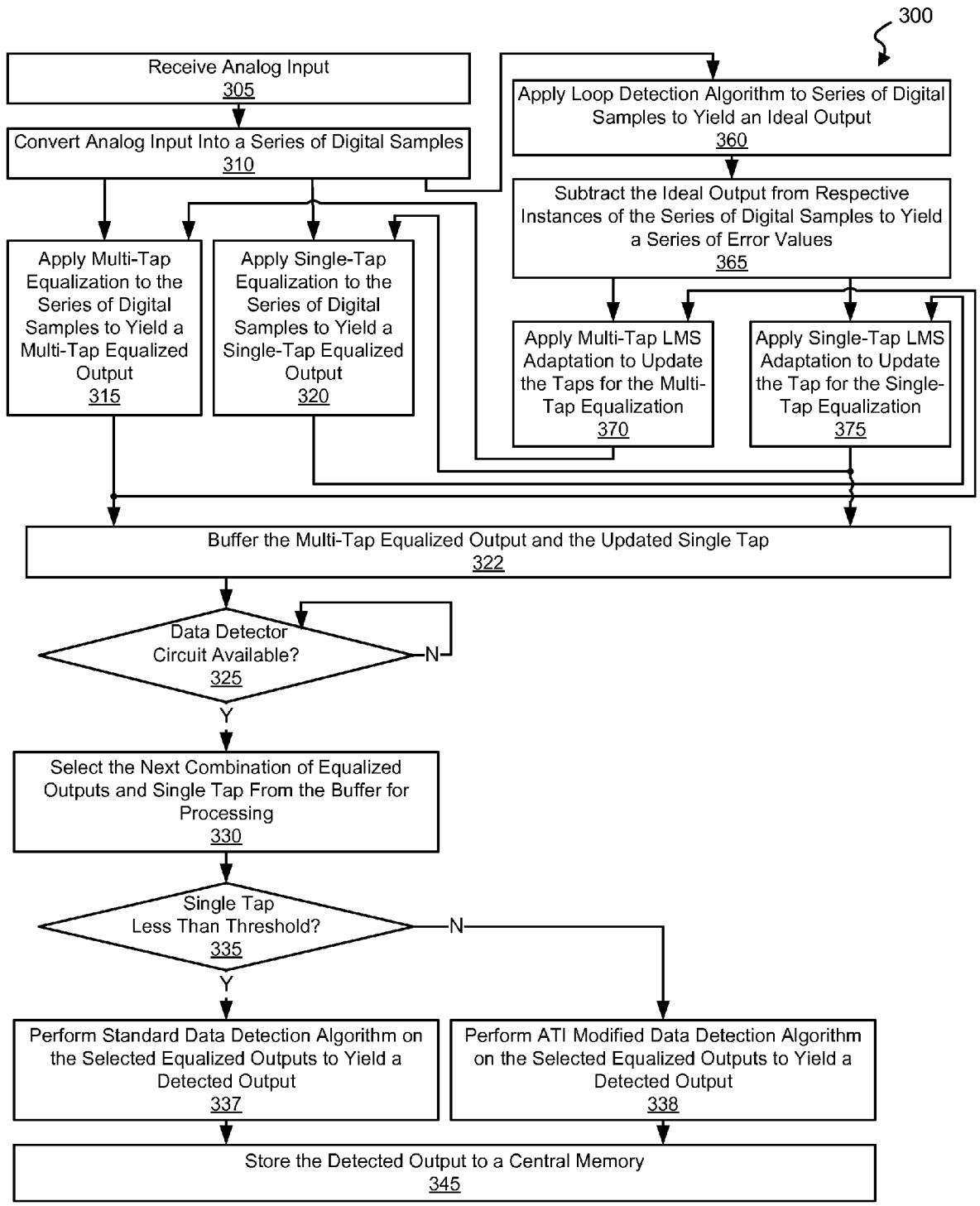
FIGS. 3a-3b are flow diagrams showing a method for characterizing and mitigating adjacent track interference in accordance with various embodiments of the present invention.
Figure 3B:
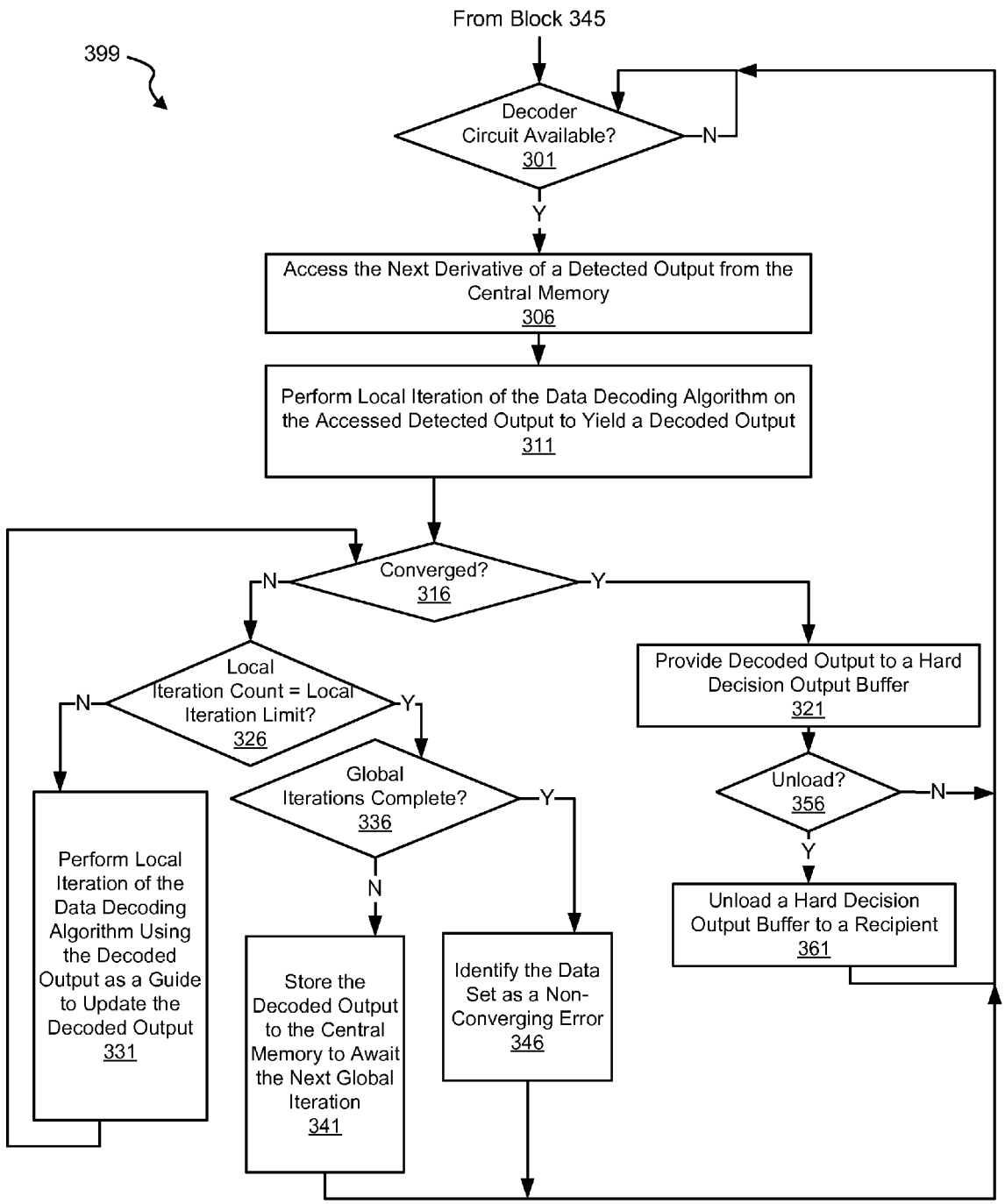

Turning to FIGS. 3a-3b are flow diagrams 300, 399 showing a method for characterizing and mitigating adjacent track interference in accordance with some embodiments of the present invention. Following flow diagram 300 of FIG. 3a, multiple analog inputs are received from respective read heads (block 305). The analog inputs may be derived from, for example, a storage medium. Based upon the disclosure provided herein, one of ordinary skill in the art will recognize a variety of sources of the analog inputs. Each of the analog inputs is converted to a respective series of digital samples (block 310). This conversion may be done using analog to digital converter circuits or systems as are known in the art. Of note, any circuit known in the art that is capable of converting an analog signal into a series of digital samples representing the received analog signal may be used.

Multi-tap equalization is applied to the series of digital samples to yield a multi-tap equalized output (block 315). A single-tap equalization is also applied to the series of digital samples to yield a single-tap equalized output (block 320). Both the multi-tap equalization and the single-tap equalization may be performed using digital finite impulse response circuits, with the multi-tap equalization relying on two or more taps and the single-tap equalization relying on a single tap. The taps are provided from blocks 370, 375 which are more fully described below.

A loop detection algorithm is applied to the series of digital samples to yield an ideal output (block 360). The loop detection algorithm may be applied by any circuit known in the art that applies some type of algorithm designed to return a representation of the data from which the analog input was derived. In one particular embodiment of the present invention, the loop detection algorithm is operable to determine timing feedback and other operations designed to align the sampling related to the analog to digital conversion, and/or to adjust a gain applied by an analog front end circuit. Based upon the disclosure provided herein, one of ordinary skill in the art will recognize a variety of loop detection algorithms capable of providing a representation of the data from which the analog input was derived that may be used in relation to different embodiments of the present invention.

The ideal output is subtracted from the respective instances of the series of digital samples to yield a series of error values (block 365). A multi-tap least mean squared (LMS) adaptation is applied to update the taps for the multi-tap equalization used in block 315 (block 370), and a single-tap least mean squared (LMS) adaptation is applied to update the single-tap for the single-tap equalization used in block 320 (block 375).

The multi-tap equalized output from block 315 and the updated single-tap from block 375 are stored to a buffer (block 322). It is determined whether a data detector circuit is available to process the buffered equalized output (block 325). Where a data detector circuit is available to process a data set (block 325), the next available set of multi-tap equalized output from the buffer and the corresponding updated single tap is selected from the buffer for processing (block 330).

It is determined whether the updated single tap is less than a threshold value (block 335). In some cases, the threshold is user programmable. Where the value of the single-tap is less than the threshold (block 335), a standard data detection algorithm is applied to the selected equalized outputs to yield a detected output (block 337). This standard data detection algorithm includes calculating branch metrics using a prior art branch metric calculation as set forth below:

$$\text{Branch Metric} = \min\left(\sum_{i,j} \frac{(\text{buffered data}(i) - \text{ideal } output_j)^2}{2\sigma_j^2}\right).$$

In contrast, where the value of the single-tap is not less than the threshold (block 335), an adjacent track interference modified data detection algorithm is applied to the selected equalized outputs to yield the detected output (block 338). This adjacent track interference modified data detection algorithm includes calculating branch metrics using a the following branch metric calculation:

$$\text{Branch Metric} = \min\left(\sum_{i,j} \frac{(\text{buffered data}(i) - \text{ideal } output_j - ATI \text{ mitigation } factor_j)^2}{2\sigma_j^2}\right).$$

The detected output (or a derivative thereof) is then stored to a central memory (block 345).

Turning to FIG. 3b and following flow diagram 399, it is determined whether a data decoder circuit is available (block 301) in parallel to the previously described data detection process of FIG. 3a. The data decoder circuit may be, for example, a low density parity check data decoder circuit as are known in the art. Where the data decoder circuit is available (block 301) the next derivative of a detected output is selected from the central memory (block 306). The derivative of the detected output may be, for example, an interleaved (shuffled) version of a detected output from the data detector circuit. A first local iteration of a data decoding algorithm is applied by the data decoder circuit to the selected detected output to yield a decoded output (block 311). It is then determined whether the decoded output converged (e.g., resulted in the originally written data as indicated by the lack of remaining unsatisfied checks) (block 316).

Where the decoded output converged (block 316), it is provided as a decoded output codeword to a hard decision output buffer (e.g., a re-ordering buffer) (block 321). It is determined whether the received output codeword is either sequential to a previously reported output codeword in which case reporting the currently received output codeword immediately would be in order, or that the currently received output codeword completes an ordered set of a number of codewords in which case reporting the completed, ordered set of codewords would be in order (block 356). Where the currently received output codeword is either sequential to a previously reported codeword or completes an ordered set of codewords (block 356), the currently received output codeword and, where applicable, other codewords forming an in order sequence of codewords are provided to a recipient as an output (block 361).

Alternatively, where the decoded output failed to converge (e.g., errors remain) (block 316), it is determined whether the number of local iterations already applied equals the maximum number of local iterations (block 326). In some cases, a default seven local iterations are allowed per each global iteration. Based upon the disclosure provided herein, one of ordinary skill in the art will recognize another default number of local iterations that may be used in relation to different embodiments of the present invention. Where another local iteration is allowed (block 326), the data decoding algorithm is applied to the selected data set using the decoded output as a guide to update the decoded output (block 331). The processes of blocks starting at block 316 are repeated for the next local iteration.

Alternatively, where all of the local iterations have occurred (block 326), it is determined whether all of the global iterations have been applied to the currently processing data set (block 336). Where the number of global iterations has not completed (block 336), the decoded output is stored to the central queue memory circuit to await the next global iteration (block 341). Alternatively, where the number of global iterations has completed (block 336), an error is indicated and the data set is identified as non-converging (block 346).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    an adjacent track interference characterization circuit operable to provide an interference characterization output representing interference from one or more adjacent tracks on a current track based at least in part on a data input derived from the current track, wherein the adjacent track interference characterization circuit includes:
        an equalizer circuit operable to apply an equalization algorithm to the data input to yield an equalized output, wherein application of the equalization algorithm is governed by a tap value;
        a summation circuit operable to calculate an error value as a difference between the equalized output and an ideal output;
        a tap value adaptation circuit operable to update the tap value to reduce the error value, wherein the tap value is provided as the interference characterization output; and
    a comparator circuit operable to compare the interference characterization output with a threshold value to yield an interference indicator.

2. The data processing system of claim 1, wherein the interference characterization output increases in value as a function of a number of times the adjacent tracks are written after the current track is written.

3. The data processing system of claim 1, wherein the equalizer circuit is a single tap equalizer circuit.

4. The data processing system of claim 1, wherein the equalizer circuit is a digital finite impulse response circuit.

5. The data processing system of claim 1, wherein the data processing system further comprises:
    a loop detector circuit operable to apply a loop detection algorithm to the data input to yield a detected output, wherein the ideal output is derived from the detected output.

6. The data processing system of claim 5, wherein the data processing system further comprises:
    a selector circuit operable to select one of the detected output or a known data set as the ideal output.

7. The data processing system of claim 1, wherein the equalizer circuit is a first equalizer circuit, wherein the equalized output is a first equalized output, wherein the error value is a first error value, wherein the summation circuit is a first summation circuit, wherein the tap value adaptation circuit is a first tap value indication circuit, and wherein the data processing system further comprises:
    a second equalizer circuit operable to apply an equalization algorithm to the data input to yield a second equalized output, wherein application of the equalization algorithm is governed by two or more tap values;
    a second summation circuit operable to calculate a second error value as a difference between the second equalized output and the ideal output;
    a second tap value adaptation circuit operable to update the two or more tap values to reduce the second error value.

8. The data processing system of claim 7, wherein the data processing system further comprises:
    a data detector circuit operable to a apply a data detection algorithm to the second equalized output to yield a detected output; and a data decoder circuit operable to apply a data decoding algorithm to a decoder input derived from the detected output to yield a decoded output.

9. The data processing system of claim 8, wherein the data detector circuit is selected from a group consisting of: a maximum a posteriori data detector circuit, and a Viterbi algorithm data detector circuit.

10. The data processing system of claim 8, wherein the data decoder circuit is a low density parity check decoder circuit.

11. The data processing system of claim 1, wherein the system is implemented as an integrated circuit.

12. The data processing system of claim 1, wherein the system is implemented as part of a storage device including a storage medium, and wherein the current track and the one or more adjacent tracks are on the storage medium.

13. The data processing system of claim 1, wherein the threshold value is programmable.

14. A method for characterizing adjacent track interference in a storage device, the method comprising:
   applying an equalization algorithm to a data input derived from a current track to yield an equalized output, wherein application of the equalization algorithm is governed by a tap value;
   calculating an error value using a summation circuit, wherein the error value is a difference between the equalized output and an ideal output;
   adaptively updating the tap value to reduce the error value using a least mean squared algorithm; and
   comparing the tap value with a threshold value to yield an interference indicator.

15. The method of claim 14, wherein the interference characterization output increases in value as a function of a number of times the adjacent tracks are written after the current track is written.

16. The method of claim 14, wherein the equalizer circuit is a digital finite impulse response circuit.

17. The method of claim 14, wherein applying the equalization algorithm to the data input derived from the current track to yield the equalized output is governed by a single tap value, wherein the equalized output is a first equalized output, wherein the error value is a first error value, wherein the summation circuit is a first summation circuit, and wherein the method further comprises:
   applying the equalization algorithm to the data input derived from the current track to yield a second equalized output, wherein application of the equalization algorithm is governed by two or more tap value;
   calculating a second error value using a second summation circuit, wherein the second error value is a difference between the second equalized output and the ideal output;
   adaptively updating the two or more tap values to reduce the second error value using a least mean squared algorithm; and
   providing the second equalized output as a processing input to a processing circuit.

18. The method of claim 17, wherein the processing circuit comprises:
   a data detector circuit operable to a apply a data detection algorithm to the processing input to yield a detected output; and
   a data decoder circuit operable to apply a data decoding algorithm to a decoder input derived from the detected output to yield a decoded output.

19. A hard disk drive, the hard disk drive comprising:
   a disk platter including a current track, a first adjacent track on a first side of the current track, and a second adjacent track on a second side of the current track;
   a head assembly disposed in relation to the disk platter and operable to derive an analog input by sensing the current track;
   an analog to digital circuit operable to provide a series of digital samples corresponding to the analog input;
   an adjacent track interference characterization circuit operable to provide an interference characterization output representing interference from at least one of the first adjacent track and the second adjacent track, wherein the adjacent track interference characterization circuit includes:
      a first equalizer circuit operable to apply a first equalization algorithm to the series of digital samples to yield a first equalized output, wherein application of the first equalization algorithm is governed by a single tap value;
      a first summation circuit operable to calculate a first error value as a difference between the first equalized output and an ideal output; and
      a first tap value adaptation circuit operable to update the single tap value to reduce the first error value, wherein the single tap value is provided as the interference characterization output; and
   an equalization circuit including:
      a second equalizer circuit operable to apply a second equalization algorithm to the series of digital samples to yield a second equalized output, wherein application of the second equalization algorithm is governed by two or more tap values;
      a second summation circuit operable to calculate a second error value as a difference between the second equalized output and the ideal output;
      a second tap value adaptation circuit operable to update the two or more tap values to reduce the second error value; and
   a processing circuit operable to apply a processing algorithm to the second equalized output to yield a processed data set corresponding to information originally stored to the disk platter.

20. A data processing system, the data processing system comprising:
   an adjacent track interference characterization circuit operable to provide an interference characterization output representing interference from one or more adjacent tracks on a current track based at least in part on a data input derived from the current track, wherein the interference characterization output increases in value as a function of a number of times the adjacent tracks are written after the current track is written, and wherein the adjacent track interference characterization circuit includes:
      an equalizer circuit operable to apply an equalization algorithm to the data input to yield an equalized output, wherein application of the equalization algorithm is governed by a tap value;
      a summation circuit operable to calculate an error value as a difference between the equalized output and an ideal output; and
      a tap value adaptation circuit operable to update the tap value to reduce the error value, wherein the tap value is provided as the interference characterization output.

21. The data processing system of claim 20, wherein the data processing system further comprises:
    a comparator circuit operable to compare the interference characterization output with a threshold value to yield an interference indicator.

* * * * *